(12) United States Patent
Fujimaki

(10) Patent No.: US 9,372,345 B2
(45) Date of Patent: Jun. 21, 2016

(54) HEAD-MOUNTED DISPLAY DEVICE

(71) Applicant: Seiko Epson Corporation, Tokyo (JP)

(72) Inventor: Yutaka Fujimaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 146 days.

(21) Appl. No.: 13/831,928

(22) Filed: Mar. 15, 2013

(65) Prior Publication Data

US 2013/0257690 A1 Oct. 3, 2013

(30) Foreign Application Priority Data

Mar. 27, 2012 (JP) ................................. 2012-071587

(51) Int. Cl.
*G02B 27/01* (2006.01)
(52) U.S. Cl.
CPC ...... *G02B 27/017* (2013.01); *G02B 2027/0138* (2013.01); *G02B 2027/0141* (2013.01)
(58) Field of Classification Search
CPC ..................... G02B 27/017; G02B 2027/0138; G02B 2027/0141
USPC ........ 359/458, 629–630; 348/42–60; 345/7–8
See application file for complete search history.

(56) References Cited

U.S. PATENT DOCUMENTS 8,045,825 B2 * 10/2011 Shimoyama et al. ......... 382/284
8,576,276 B2 * 11/2013 Bar-Zeev et al. ............... 348/53
2002/0044152 A1 * 4/2002 Abbott et al. .................. 345/629
2003/0020707 A1 * 1/2003 Kangas et al. ................. 345/418
2011/0234386 A1 * 9/2011 Matsuda ..................... 340/12.54
2013/0335301 A1 * 12/2013 Wong et al. ........................ 345/8

FOREIGN PATENT DOCUMENTS

JP 2010-130632 A 6/2010

* cited by examiner

*Primary Examiner* — Kumar Patel
*Assistant Examiner* — Amy C Onyekaba
(74) *Attorney, Agent, or Firm* — ALG Intellectual Property, LLC

(57) ABSTRACT

A head-mounted display device includes an image processing unit configured to perform processing for generating an image, an image display unit including an image-light generating unit configured to generate image light representing the image, the image display unit being configured to enable a user to visually recognize the virtual image and an external image, an image pickup unit provided in the image display unit and configured to pick up an image in a visual field direction of the user, and a position detecting unit configured to specify an external apparatus present in the picked-up image picked up by the image pickup unit and detect a position in the picked-up image of the external apparatus. The image processing unit generates an image in which information concerning the external apparatus is displayed in a position corresponding to the position detected by the position detecting unit.

11 Claims, 6 Drawing Sheets

HEAD-MOUNTED DISPLAY DEVICE

BACKGROUND

1. Technical Field

The present invention relates to a head-mounted display device that enables a user to visually recognize a virtual image in a state in which the head-mounted display device is mounted on the head of the user.

2. Related Art

As an apparatus remote operation system for remotely operating an apparatus, there has been known an apparatus remote operation system that identifies the apparatus, generates an operation information image of the identified apparatus, and outputs the operation information image to a head mounted display (see JP-A-2010-130632 (Patent Literature 1)).

However, the apparatus remote operation system identifies the apparatus irrespective of whether the apparatus to be remotely operated is present within the visual field of the user. The user cannot intuitively grasp a correspondence between the displayed operation information image and the apparatus. That is, the apparatus remote operation system cannot display the operation information image in a position corresponding to the position of the apparatus in the visual field unless the user turns to the direction of the apparatus that the user is about to operate.

SUMMARY

An advantage of some aspects of the invention is to provide a head-mounted display device that can specify an external apparatus present in the visual field of a user.

(1) An aspect of the invention is directed to a head-mounted display device that enables a user to visually recognize a virtual image in a state in which the head-mounted display device is mounted on the head of the user, the head-mounted display device including: an image processing unit configured to perform processing for generating an image; an image display unit including an image-light generating unit configured to generate image light representing the image, the image display unit being configured to enable a user to visually recognize the virtual image and an external image; an image pickup unit provided in the image display unit and configured to pick up an image in a visual field direction of the user; and a detecting unit configured to specify an external apparatus visually recognized as the external image, the external apparatus being present in the picked-up image picked up by the image pickup unit.

According to the aspect of the invention, it is possible to provide a head-mounted display device that can specify an external apparatus visually recognized as an external image.

(2) In the head-mounted display device, the detecting unit may detect a position in the picked-up image of the specified external apparatus, and the head-mounted display device may further include an image processing unit configured to generate an image in which information concerning the external apparatus is displayed in a position corresponding to the position detected by the detecting unit.

According to this configuration, an external apparatus present in a picked-up image picked up by the image pickup unit configured to pick up an image in the visual field direction of the user is specified. A position in the picked-up image of the specified external apparatus is detected. An image in which information concerning external apparatus is displayed in a position corresponding to the detected position is generated. Therefore, it is possible to display, as a virtual image, the information concerning the external apparatus in the position corresponding to the position of the external apparatus present in an external image. The user can more intuitively recognize the information concerning the external apparatus.

(3) The head-mounted display device may cause the image display unit to display, as a virtual image, the information concerning the external apparatus in association with the external apparatus visually recognized as the external image and cause the user to visually recognize the external image in regions other than a region where the virtual image is displayed.

According to this configuration, it is possible to allow an external apparatus to be easily visually recognized while displaying information concerning the external apparatus as a virtual image.

(4) In the head-mounted display device, the image processing unit may generate an image in which regions other than a region where the information concerning the external apparatus is displayed are black pixels.

According to this configuration, it is possible allow an external apparatus to be easily visually recognized while displaying information concerning the external apparatus as a virtual image.

(5) The head-mounted display device may further include a receiving unit configured to receive the information concerning the external apparatus from the external apparatus.

(6) The head-mounted display device may further include: an operation unit for the user to input operation information; and a transmitting unit configured to transmit a given command to the external apparatus, the receiving unit may receive, as the information concerning the external apparatus, information concerning commands operable in the external apparatus, and the transmitting unit may transmit, among the operable commands, a command selected on the basis of the operation information to the external apparatus.

According to this configuration, information concerning commands operable by an external apparatus is displayed as a virtual image in a position corresponding to the position of the external apparatus present in an external image. The user can select a command while looking at the operable commands displayed as the virtual image and operate the external apparatus and can more intuitively operate the external apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

A preferred embodiment of the invention is explained in detail below with reference to the drawings. The embodiment explained below does not unduly limit contents of the invention described in the appended claims. All of components explained below are not always essential constituent elements of the invention.

1. Configuration

Figure 1:
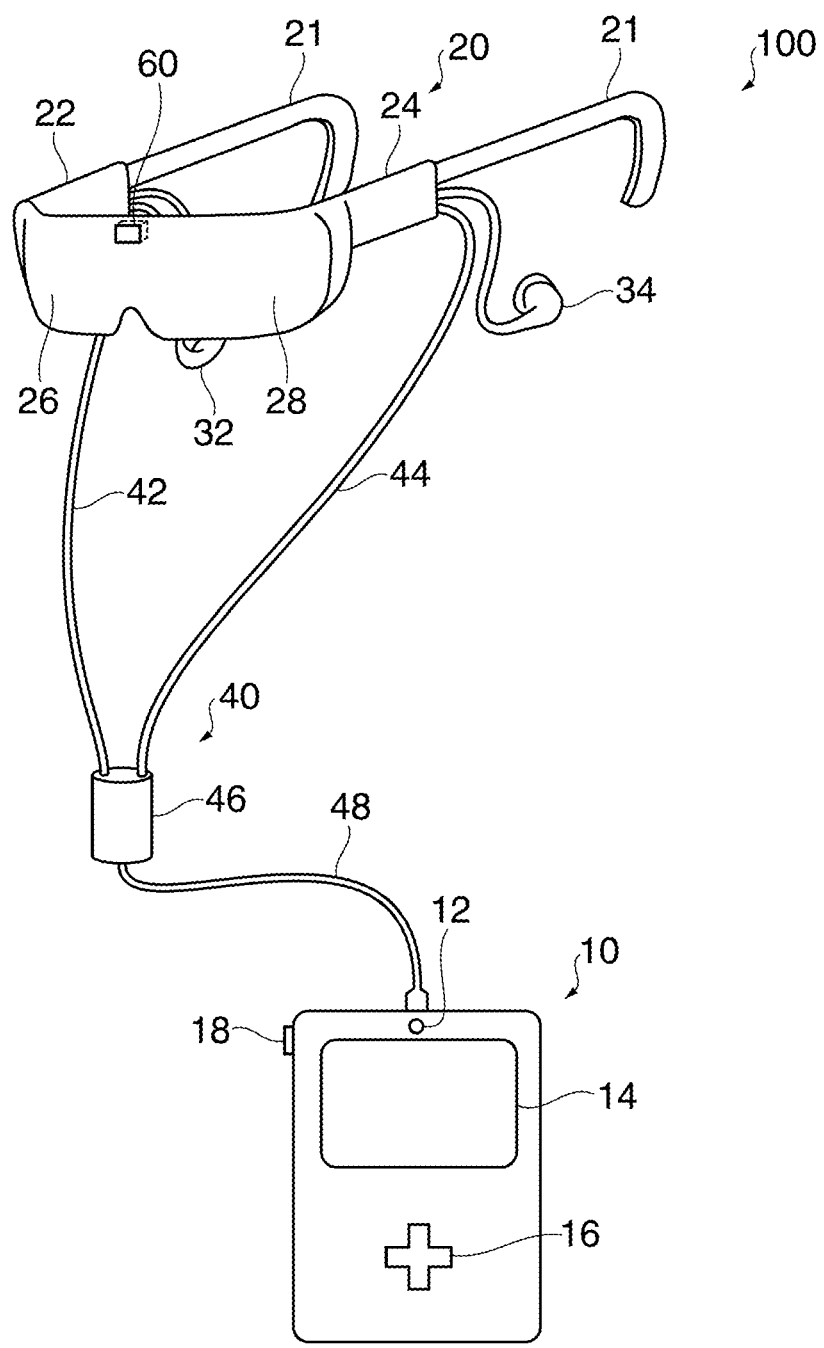
FIG. 1 is an external view showing an example of the configuration of a head-mounted display device according to an embodiment.

FIG. 1 is an external view showing an example of the configuration of a head-mounted display device according to an embodiment.

A head-mounted display device 100 is a display device mounted on a head and is called head mounted display (HMD) as well. The head-mounted display device 100 according to this embodiment is an optically transmissive (so-called see-through type) head-mounted display device with which a user can directly visually recognize an external scene (an external image) simultaneously with visually recognizing a virtual image.

The head-mounted display device 100 includes an image display unit 20 configured to enable the user to visually recognize a virtual image in a state in which the head-mounted display device 100 is mounted on the head of the user and a control unit 10 configured to control the image display unit 20.

The image display unit 20 is a wearing body worn on the head of the user. In this embodiment, the image display unit 20 has an eyeglass shape. The image display unit 20 includes ear hook units 21, a right display driving unit 22, a left display driving unit 24, a right optical-image display unit 26, and a left optical-image display unit 28. In the image display unit 20, an image pickup unit 60 (an image sensor) configured to pickup an image in a visual field direction of the user is provided. The ear hook units 21 are members provided to traverse on the ears of the user from ends of the right display driving unit 22 and the left display driving unit 24. The ear hook units 21 function as temples. The right optical-image display unit 26 and the left optical-image display unit 28 are respectively arranged to be located in front of the right and left eyes of the user in a state in which the user wears the image display unit 20. The right display driving unit 22 is arranged in a connecting place of the ear hook unit 21 for the right ear and the right optical-image display unit 26. The left display driving unit 24 is arranged in a connecting place of the ear hook unit 21 for the left ear and the left optical-image display unit 28. In the following explanation, the right display driving unit 22 and the left display driving unit 24 are collectively simply referred to as "display driving unit" and the right optical-image display unit 26 and the left optical-image display unit 28 are collectively simply referred to as "optical-image display unit".

The display driving unit includes a driving circuit, an LCD (liquid crystal display), and a projection optical system, which are not shown in the figure. The optical-image display unit includes a light guide plate and a dimming plate, which are not shown in the figure. The light guide plate is formed of an optically transparent resin material or the like. The light guide plate emits image light, which is captured from the display driving unit, to the eyes of the user. The dimming plate is an optical element having a thin plate shape. The dimming plate is arranged to cover the front side (a side opposite to the side of the eyes of the user) of the image display unit 20. The dimming plate can protect the light guide plate, suppress damage to the light guide plate, adhesion of stains, and the like, and adjust an amount of external light entering the eyes of the user and adjust easiness of visual recognition of a virtual image by adjusting light transmittance of the dimming plate. The dimming plate does not have to be provided.

The image display unit 20 further includes a right earphone 32 for the right ear and a left earphone 34 for the left ear. The right earphone 32 and the left earphone 34 are respectively worn on the right and left ears when the user wears the image display unit 20.

The image display unit 20 further includes a connecting unit 40 for connecting the image display unit 20 to the control unit 10. The connecting unit 40 includes a main body cord 48 connected to the control unit 10, a right cord 42 and a left cord 44, which are two cords branching from the main body cord 48, and a coupling member 46 provided in a branching point. The right cord 42 is connected to the right display driving unit 22 and the left cord 44 is connected to the left display driving unit 24. The image display unit 20 and the control unit 10 perform transmission of various signals via the connecting unit 40. Connectors (not shown in the figure) fitting with each other are respectively provided in an end portion of the main body cord 48 on the opposite side of the coupling member 46 and the control unit 10. The control unit 10 and the image display unit 20 can be connected and disconnected by fitting and release of the fitting of the connector of the main body cord 48 and the connector of the control unit 10. As the main body cord 48, the right cord 42, and the left cord 44, a metal cable or an optical fiber can be adopted.

The control unit 10 is a device for supplying electric power to the head-mounted display device 100 and controlling the image display unit 20. The control unit 10 includes a lighting unit 12, a touch pad 14, a cross key 16, and a power switch 18. The lighting unit 12 notifies, with a light-emitting state thereof, an operation state of the image display unit 20 (e.g., an ON/OFF state of a power supply). As the lighting unit 12, a light source such as an LED can be used. The touch pad 14 detects operation of a finger of the user on an operation surface of the touch pad 14 and outputs a signal (operation information) corresponding to detected content. The cross key 16 detects depressing operation for keys corresponding to the up down and left right directions and outputs a signal (operation information) corresponding to detected content. The power switch 18 detects slide operation of a switch to switch a power input state of the head-mounted display device 100.

Figure 2:
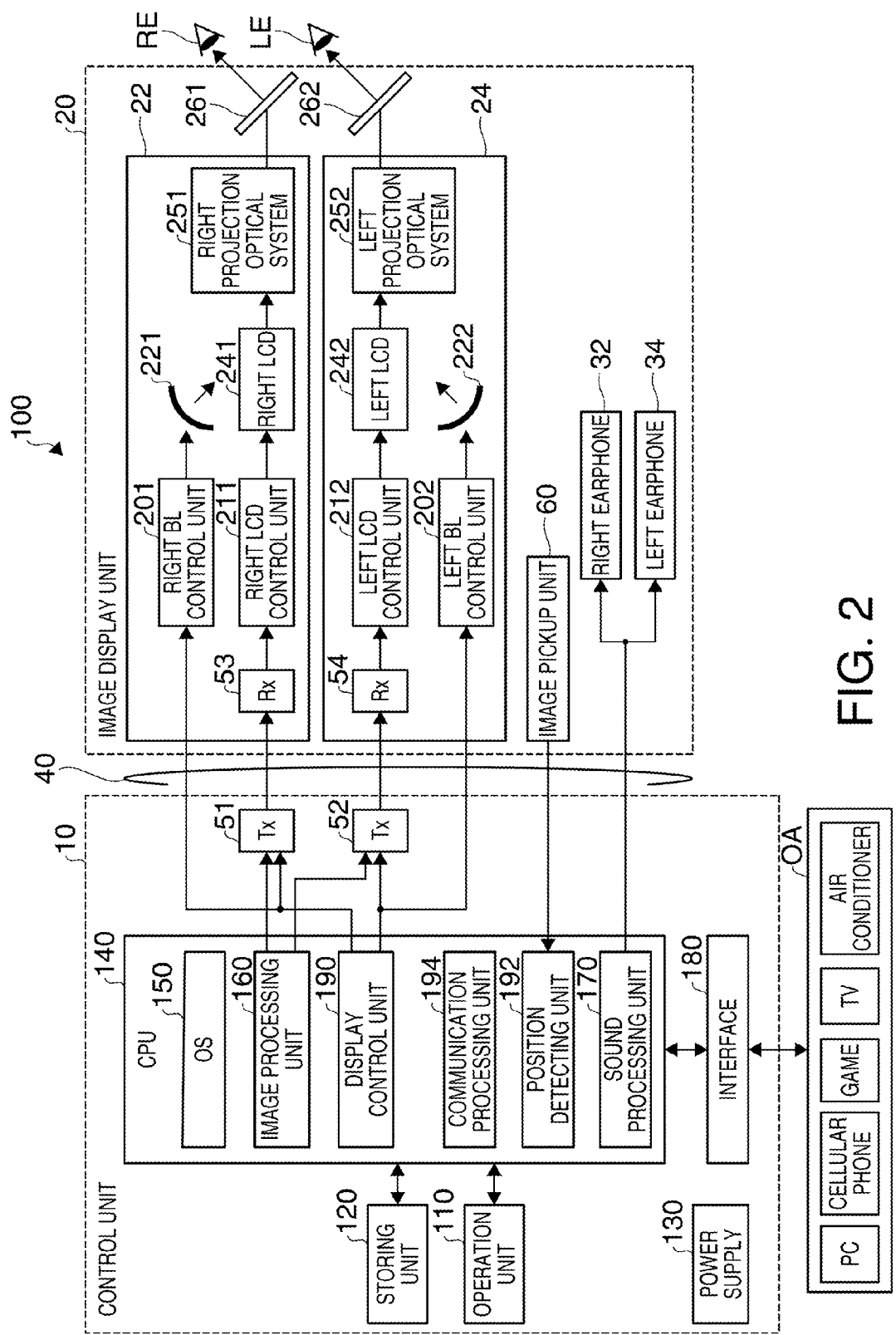
FIG. 2 is a functional block diagram functionally showing the configuration of the head-mounted display device according to the embodiment.

FIG. 2 is a functional block diagram functionally showing the configuration of the head-mounted display device 100. The control unit 10 includes an operation unit 110 (in this embodiment, the touch pad 14, the cross key 16, and the power switch 18), a storing unit 120, a power supply 130, a CPU 140, an interface 180, and transmitting units (Tx) 51 and 52. The units are connected to one another by a not-shown bus.

The storing unit 120 is a storing unit including a ROM, a RAM, a DRAM, and a hard disk. The power supply 130 supplies electric power to the units of the head-mounted display device 100. As the power supply 130, for example, a secondary battery can be used.

The CPU 140 executes a computer program installed in advance to thereby provide a function of an operating system (OS) 150. The CPU 140 expands firmware or a computer program, which is stored in the ROM or the hard disk, on the RAM and executes the firmware or the computer program to thereby function as an image processing unit 160, a sound processing unit 170, a display control unit 190, a position detecting unit 192, and a communication processing unit 194 as well.

The interface 180 is an interface for connecting various external apparatuses OA (e.g., a personal computer (PC), a cellular phone terminal, and a gate terminal), which are supply sources of contents, and various external apparatuses OA (e.g., a television, an air conditioner, and a lighting apparatus), which are targets of remote operation, to the control unit 10. As the interface 180, the control unit 10 includes, for example, a USB interface, a memory card interface, and a wireless LAN interface. The contents mean information contents including images (still images and moving images) and sound.

The image processing unit 160 generates a clock signal, a vertical synchronization signal, a horizontal synchronization signal, and image data on the basis of contents input via the interface 180 and supplies the signals to the image display unit 20 via the connecting unit 40. Specifically, the image processing unit 160 acquires an image signal included in the contents. For example, in the case of a moving image, in general, the acquired image signal is an analog signal including thirty frame images per one second. The image processing unit 160 separates synchronization signals such as a vertical synchronization signal and a horizontal synchronization signal from the acquired image signal. The image processing unit 160 generates a clock signal using a PLL circuit (not shown in the figure) according to periods of the vertical synchronization signal and the horizontal synchronization signal separated from the image signal.

The image processing unit 160 converts the analog signal, from which the synchronization signals are separated, into a digital image signal using an A/D converter (not shown in the figure). Thereafter, the image processing unit 160 stores the digital image signal after the conversion in the DRAM in the storing unit 120 frame by frame as image data (RGB data) of a target image. The image processing unit 160 may execute, on the image data, image processing such as resolution conversion processing, various tone correction processing such as adjustment of luminance and chroma, and Keystone correction processing according to necessity.

The image processing unit 160 transmits the generated clock signal, the vertical synchronization signal, the horizontal synchronization signal, and the image data stored in the DRAM of the storing unit 120 respectively via the transmitting units 51 and 52. The image data transmitted via the transmitting unit 51 is referred to as "image data for right eye" and the image data transmitted via the transmitting unit 52 is referred to as "image data for left eye". The transmitting units 51 and 52 function as transceivers for serial transmission between the control unit 10 and the image display unit 20. The image processing unit 160 may generate images according to processing results of various applications installed in the OS 150 and transmit the generated images respectively via the transmitting units 51 and 52. In particular, the image processing unit 160 in this embodiment generates images including information concerning various external apparatuses OA, which are targets of remote operation, and transmits the generated images respectively as image data for right eye and image data for left eye via the transmitting units 51 and 52.

The display control unit 190 generates control signals for controlling the right display driving unit 22 and the left display driving unit 24. Specifically, the display control unit 190 individually controls, according to the control signals, driving ON/OFF of a right LCD 241 by a right LCD control unit 211, driving ON/OFF of a right backlight 221 by a right backlight control unit 201, driving ON/OFF of a left LCD 242 by a left LCD control unit 212, driving ON/OFF of a left backlight 222 by a left backlight control unit 202, and the like to thereby control generation and emission of image light by each of the right display driving unit 22 and the left display driving unit 24.

The display control unit 190 transmits the control signals to the right LCD control unit 211 and the left LCD control unit 212 respectively via the transmitting units 51 and 52. The display control unit 190 transmits the control signals to the right backlight control unit 201 and the left backlight control unit 202 respectively via the transmitting units 51 and 52.

The position detecting unit 192 (a detecting unit) acquires image data (a picked-up image) from the image pickup unit 60, which is provided in the image display unit 20, via the connecting unit 40. The position detecting unit 192 specifies (identifies) an external apparatus OA present in the acquired picked-up image (the external apparatus OA recognized as an external image and set as a target of remote operation) and detects a position in the picked-up image of the specified (identified) external apparatus OA. For example, the position detecting unit 192 detects, from the picked-up image, identification markers such as an LED light-emitting unit and a two-dimensional barcode provided in the external apparatus OA set as the target of remote operation to thereby perform identification of the external apparatus OA and detection of a position.

The image processing unit 160 generates an image in which information concerning the external apparatus OA set as the target of remote operation (e.g., information representing a state of the external apparatus OA or information concerning commands operable in the external apparatus OA) is displayed in a position corresponding to the position detected by the position detecting unit 192. The image processing unit 160 generates an image in which regions other than a region where the information concerning the external apparatus OA set as the target of remote operation is displayed are black pixels.

The communication processing unit 194 functions as a receiving unit configured to receive the information concerning the external apparatus OA set as the target of remote operation from the external apparatus OA via the interface 180 (e.g., the wireless LAN interface) and a transmitting unit configured to transmit a given command to the external apparatus OA set as the target of remote operation via the interface 180 (e.g., the wireless LAN interface). The communication processing unit 194 receives, as information concerning the external apparatus OA, the information representing a state of the external apparatus OA and the information concerning the commands operable in the external apparatus OA. The communication processing unit 194 transmits a command selected on the basis of operation information from the operation unit 110 among the commands operable in the external apparatus OA to the external apparatus OA.

The sound processing unit 170 acquires a sound signal included in the contents (or generates a sound signal according to the processing results of the various applications installed in the OS 150), amplifies the acquired or generated sound signal, and supplies the sound signal to the right earphone 32 and the left earphone 34 of the image display unit 20 via the connecting unit 40.

The image display unit 20 includes the right display driving unit 22, the left display driving unit 24, a right light guide plate 261 that configures the right optical-image display unit 26, a left light guide plate 262 that configures the left optical-image display unit 28, the image pickup unit 60, the right earphone 32, and the left earphone 34.

The right display driving unit 22 includes a receiving unit (Rx) 53, the right backlight (BL) control unit 201 and the right backlight 221 functioning as a light source, the right LCD control unit 211 and the right LCD 241 functioning as a display element, and a right projection optical system 251. The right backlight control unit 201, the right LCD control unit 211, the right backlight 221, and the right LCD 241 are collectively referred to as "image-light generating unit".

The receiving unit 53 functions as a receiver for serial transmission between the control unit 10 and the image display unit 20. The right backlight control unit 201 has a function of driving the right backlight 221 on the basis of an input control signal. The right backlight 221 is a light-emitting body such as an LED or an electroluminescence (EL). The right LCD control unit 211 has a function of driving the right LCD 241 on the basis of a clock signal, a vertical synchronization signal, a horizontal synchronization signal, and image data for right eye input via the receiving unit 53. The right LCD 241 is a transmissive liquid crystal panel on which a plurality of pixels are arranged in a matrix shape. The image-light generating unit has a function of, by driving liquid crystal corresponding to the positions of the pixels arranged in the matrix shape of the right LCD 241, changing the transmittance of light transmitted through the right LCD 241 to thereby modulate illumination light radiated from the right backlight 221 into effective image light representing an image. In the image-light generating unit in this embodiment, a backlight system is adopted. However, image light may be generated using a front light system or a reflection system. The right projection optical system 251 is configured by a collimate lens that changes image light emitted from the right LCD 241 into light beams in a parallel state. The right light guide plate 261 guides the image light emitted from the right projection optical system 251 to the right eye RE of the user while reflecting the image light along a predetermined optical path. The right projection optical system 251 and the right light guide plate 261 are collectively referred to as "light guide unit".

The left display driving unit 24 includes a receiving unit (Rx) 54, the left backlight (BL) control unit 202 and the left backlight 222 functioning as a light source, the left LCD control unit 212 and the left LCD 242 functioning as a display element, and a left projection optical system 252. The left backlight control unit 202, the left LCD control unit 212, the left backlight 222, and the left LCD 242 are collectively referred to as "image-light generating unit". The left projection optical system 252 and the left light guide plate 262 are collectively referred to as "light guide unit". The right display driving unit 22 and the left display driving unit 24 are paired. Since the units of the left display driving unit 24 have configurations and functions same as the configurations and the functions of the units of the right display driving unit 22 explained above, detailed explanation of the units of the left display driving unit 24 is omitted. The left light guide plate 262 guides the image light emitted from the left projection optical system 252 to the left eye LE of the user while reflecting the image light along a predetermined optical path.

The image pickup unit 60 picks up an image in the visual field direction of the user and outputs image data (the picked-up image) to the position detecting unit 192 via the connecting unit 40. The image pickup unit 60 is configured by an optical system such as an image pickup lens and a two-dimensional image sensor such as a CCD image sensor or a CMOS image sensor.

Figure 3:
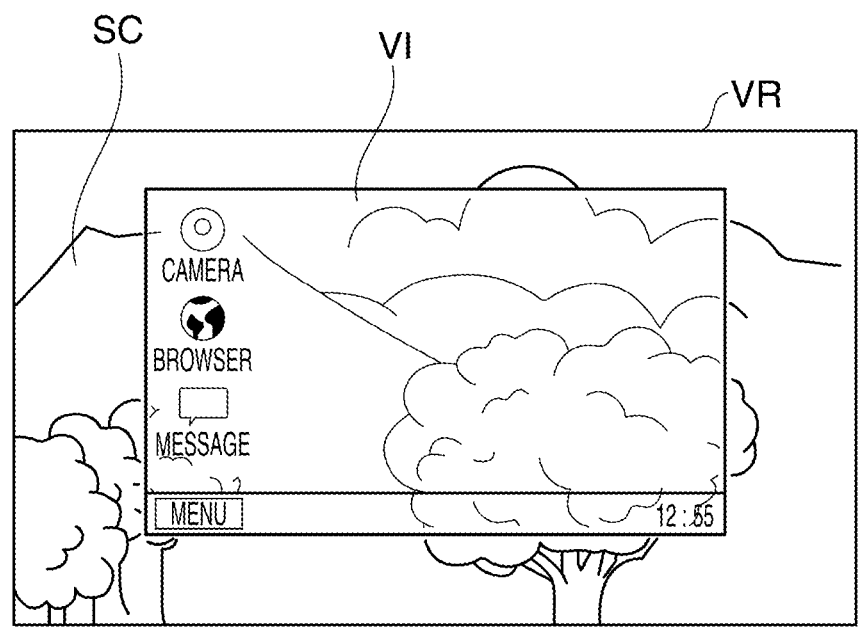
FIG. 3 is an explanatory diagram showing an example of a virtual image visually recognized by a user.

FIG. 3 is an explanatory diagram showing an example of a virtual image visually recognized by the user. The image light guided to both the eyes of the user wearing the head-mounted display device 100 as explained above is focused on the retinas of both the eyes of the user, whereby the user can visually recognize a virtual image. As shown in FIG. 3, a virtual image VI is displayed in a visual field VR of the user of the head-mounted display device 100. In portions other than a portion where the virtual image VI is displayed in the visual field VR of the user, the user can see an external scene SC (an external image) through the right optical-image display unit 26 and the left optical-image display unit 28. The head-mounted display device 100 according to this embodiment is configured such that the external scene (SC) can be seen through in the back of the virtual image VI even in the portion where the virtual image VI is displayed in the visual field VR of the user. That is, the head-mounted display device 100 according to this embodiment is configured to enable the user to visually recognize the virtual image VI and the external scene SC (the external image) and configured to enable the user to visually recognize the virtual image VI and the external scene SC (the external image) in a superimposed state in the portion where the virtual image VI is displayed in the visual field VR.

2. Method in this Embodiment

Figure 4A:
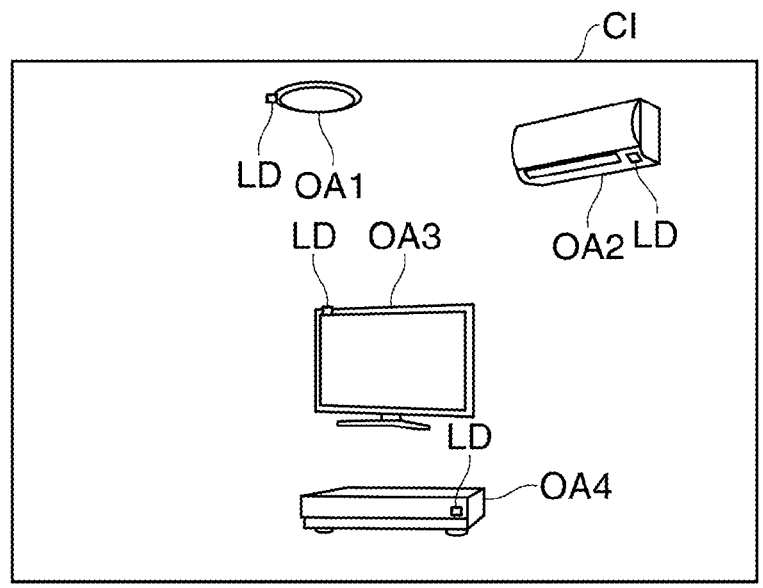
FIGS. 4A and 4B are respectively diagrams showing an example of a picked-up image picked up by an image pickup unit and an example of a display screen of a right LCD and a left LCD.

FIG. 4A is a diagram showing an example of a picked-up image picked up by the image pickup unit 60 that picks up an image in the visual field direction of the user.

In a picked-up image CI shown in FIG. 4A, four external apparatuses OA1 to OA4 set as targets of remote operation by the head-mounted display device 100 are present. The external apparatus OA1 is a lighting apparatus, the external apparatus OA2 is an air conditioner, the external apparatus OA3 is a television, and the external apparatus OA4 is a recording apparatus. Light-emitting units LD (e.g., LED light sources) that respectively emit lights in peculiar light emission patterns are provided in the external apparatuses OA1 to OA4. The light-emitting units LD may be configured to emit lights when the light-emitting units LD receive commands transmitted from the control unit 10 of the head-mounted display device 100 or may be configured to always emit lights.

The position detecting unit 192 detects the light emission patterns of the light-emitting units LD appearing in the picked-up image CI to identify the external apparatuses OA1 to OA4. The position detecting unit 192 detects the positions of the light-emitting units LD in the picked-up image CI to thereby detect the positions of the external apparatuses OA1 to OA4 in the picked-up image CI (i.e., the positions of the external apparatuses OA1 to OA4 in the visual field of the user).

Figure 4B:
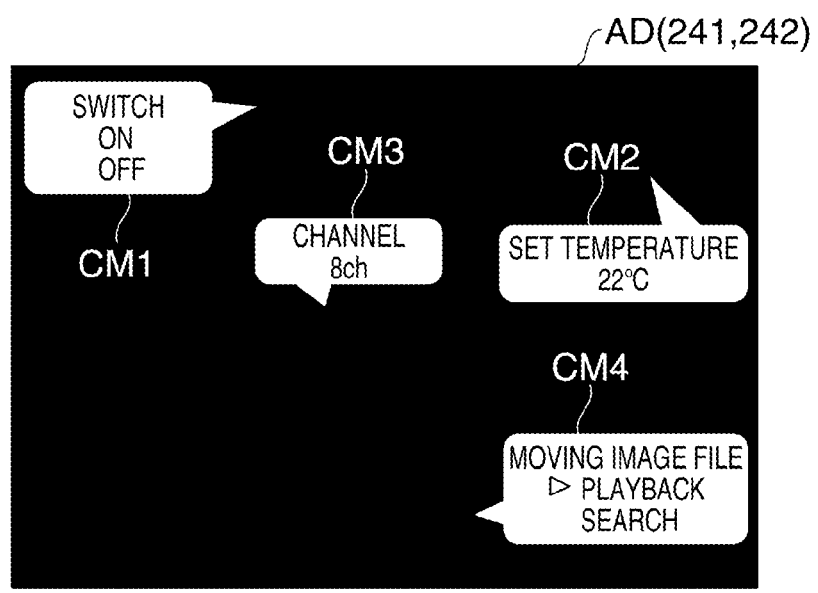
Figure 5:
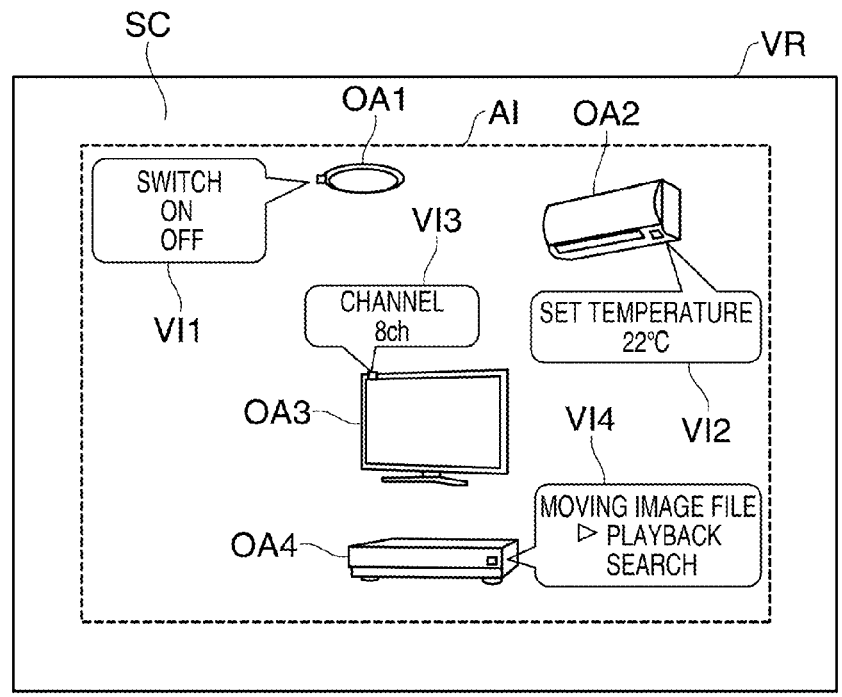
FIG. 5 is a diagram showing an example of a virtual image and an external image visually recognized by the user.

FIG. 4B is a diagram showing a display screen of the right LCD 241 (and the left LCD 242) displayed when the image processing unit 160 generates an image including information concerning the external apparatuses. FIG. 5 is a diagram showing a virtual image and an external image visually recognized by the user at that point.

In an image display region AD of the right LCD 241 shown in FIG. 4B, images CM1 to CM4 representing information concerning the external apparatuses OA1 to OA4 are formed in positions corresponding to the positions of the external apparatuses OA1 to OA4 detected by the position detecting unit 192. Specifically, in the image display region AD, the image CM1 representing a command (ON/OFF of a switch) operable by the external apparatus OA1, the image CM2 representing a state (set temperature) of the external apparatus OA2, the image CM3 representing a state (a channel currently viewed) of the external apparatus OA3, and the image CM4 representing a command (playback/search of a moving image file) operable by the external apparatus OA4 are formed. In the image display region AD, black pixels are formed in regions other than the regions where the images CM1 to CM4 are formed. A relation between a position in the picked-up image CI and a position in the image display region AD (a position on the image display region AD corresponding to a position on the picked-up image CI) is calibrated in advance. The images CM1 to CM4 are arranged on the basis of the positions detected by the position detecting unit 192 and this positional relation.

At this point, as shown in FIG. 5, virtual images VI1 to VI4 corresponding to the images CM1 to CM4 shown in FIG. 4B are displayed in a virtual image display region AI in the visual field VR of the user. In the virtual image display region AI, virtual images are not displayed in regions corresponding to the regions where the black pixels are formed on the right LCD 241. In the regions, the user can see the external scene SC (the external image). The virtual images VI1 to VI4 are displayed in the vicinities of the external apparatuses OA1 to OA4 visually recognized as the external scene SC.

As explained above, the head-mounted display device 100 according to this embodiment displays, in the virtual image display region AI superimposed on the external scene SC, information (states or images representing operable commands) concerning the external apparatuses OA1 to OA4 as the virtual images VI1 to VI4 in association with the external apparatuses OA1 to OA4 visually recognized as the external scene SC. Consequently, the user can more intuitively recognize the information concerning the external apparatuses OA1 to OA4 present in the visual field VR.

When the images such as the virtual images VI1 and VI4 representing the operable commands are displayed as the information concerning the external apparatuses OA1 and OA4, the user can select the commands displayed in the virtual images VI1 and VI4 by operating the operation unit 110 and remotely operate the external apparatuses OA1 and OA4. For example, when the user operates the cross key 16 or the touch pad 14 while looking at the virtual image VI4 displayed in the vicinity of the external apparatus OA4 and performs operation for selecting a "playback command", the command is generated and transmitted to the external apparatus OA4. The "playback command" is executed in the external apparatus OA4. In this way, the user can more intuitively operate the external apparatuses present in the visual field VR.

In the virtual image display region AI, only images representing names of the external apparatuses may be displayed in the vicinities of the external apparatuses OA1 to OA4 visually recognized as the external scene SC. States or operable commands of the external apparatuses may be displayed as a list in, for example, a lower region of the virtual image display region VI.

Figure 6:
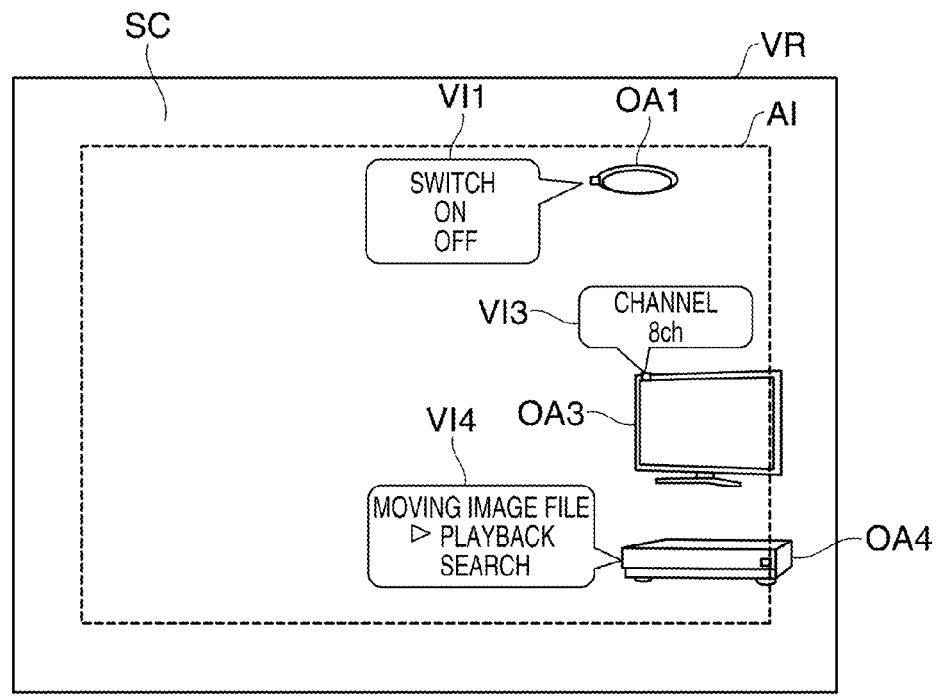
FIG. 6 is a diagram showing an example of a virtual image and an external image visually recognized by the user.

As shown in FIG. 6, when the visual field VR of the user changes, the positions of the external apparatuses detected in the picked-up image CI picked up by the image pickup unit 60 also change. Therefore, display positions of the virtual images VI1 to VI3 in the virtual image display region AI also change following the change in the positions of the external apparatuses OA1 to OA3 in the visual field VR. In FIG. 6, since the external apparatus OA2 is out of the visual field VR, the virtual image VI2 corresponding to the external apparatus OA2 is not displayed. However, even in such a case, the virtual image VI2 may be continuously displayed as history information.

The invention is not limited to the embodiments explained above. Various modifications are possible. For example, the invention includes components substantially the same as the components explained in the embodiments (e.g., components having functions, methods, and results same as those of the components explained in the embodiments or components having objects and effects same as those of the components explained in the embodiments). The invention includes components obtained by replacing unessential portions of the components explained in the embodiments. The invention includes components that can realize actions and effects same as those of the components explained in the embodiments or components that can attain objects same as those of the components explained in the embodiments. Further, the invention includes components obtained by adding publicly-known techniques to the components explained in the embodiments.

For example, in the explanation in the embodiments, the external apparatus OA is identified from the light emission patterns of the light-emitting units LD provided in the external apparatus OA and the information concerning the state and the operable commands of the external apparatus OA is acquired via the wireless LAN or the like. However, the information concerning the state and the operable commands of the external apparatus OA may also be acquired by detecting the light emission patterns of the light-emitting units LD.

In the explanation in the embodiments, the position of the external apparatus OA in the visual field of the user is always detected on the basis of the picked-up image CI. However, an inertial sensor (e.g., an acceleration sensor or an angular velocity sensor) that detects the motion of the image display unit 20 (i.e., the motion of the head of the user) may be provided in the image display unit 20. After the position of the external apparatus OA in the visual field of the user is detected on the basis of the picked-up image CI first, the position of the external apparatus OA in the visual field of the user may be detected on the basis of detection data from the inertial sensor.

Figure 7:
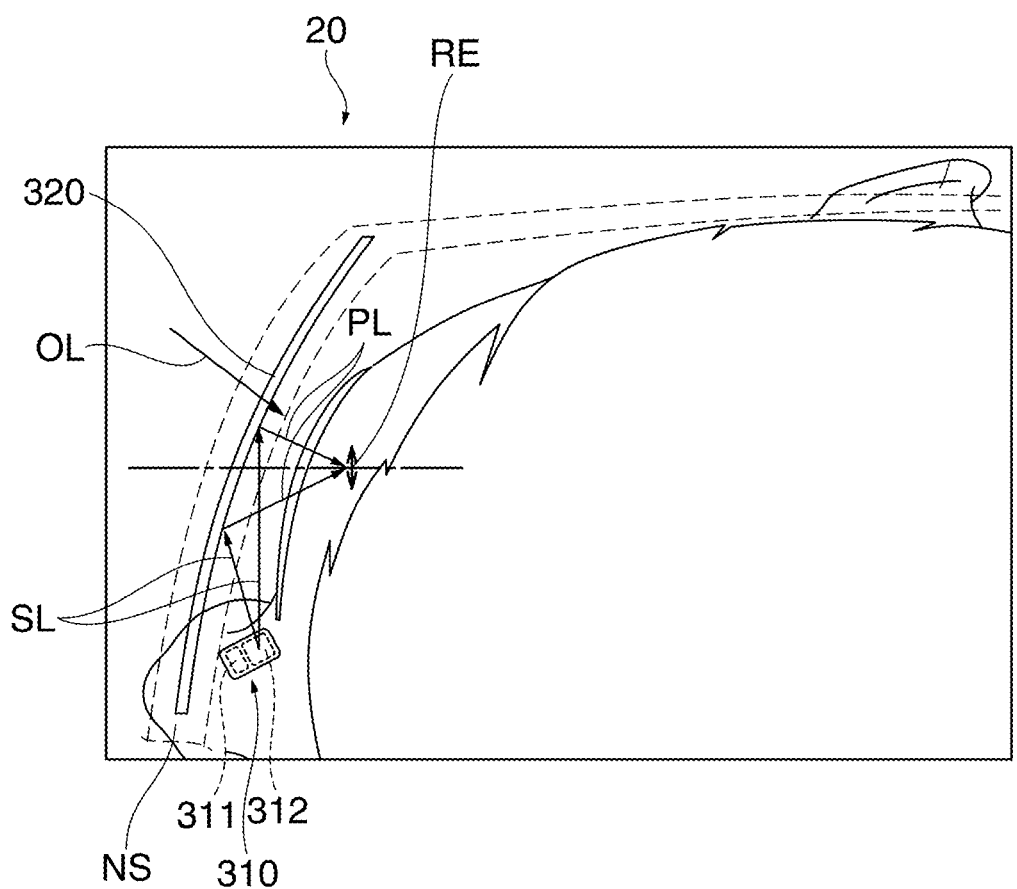
FIG. 7 is a diagram for explaining a modification.

In the explanation in the embodiment, the image-light generating unit is configured by the liquid crystal panel and the backlight and the generated image light is guided to the eyes of the user by the light guide unit. However, the invention is not limited to this. For example, as shown in FIG. 7, the image-light generating unit (the image display unit 20) may be configured by a light emitting unit 310 configured to form a signal light and emit the signal light as scanning light SL and a virtual-image forming unit 320 functioning as an irradiated member configured to receive the scanning light SL and form image light PL. As shown in FIG. 7, the light emitting unit 310 is arranged around the nose NS of the user and the virtual-image forming unit 320 is arranged to cover the front of the eyes ER of the user. The light emitting unit 310 includes a signal-light modulating unit 311 configured to form a signal light modulated to correspond to an image, a scanning optical system 312 configured to two-dimensionally scan the signal light as the scanning light SL in the virtual-image forming unit 320, and a not-shown driving control circuit. The signal-light modulating unit 311 is configured by, for example, three light sources configured to generate color lights of red, blue, and yellow and a dichroic mirror configured to combine the color lights to form signal light. The scanning optical system 312 is configured by, for example, a MEMS mirror. The virtual-image forming unit 320 is a half mirror including a semitransparent reflecting film on a transparent substrate. The virtual-image forming unit 320 receives the scanning light SL radiated from the scanning optical system 312 and reflects the scanning light SL to form a virtual image and enables the user to visually recognize the virtual image. The virtual-image forming unit 320 is configured not only to form a virtual image but also to transmit external light OL and enable the user to simultaneously visually recognize the virtual image and an external image.

The image-light generating unit (the image display unit 20) may be configured by a prism (a light guide prism) including three or more axially asymmetrical curved surfaces and a projection lens configured to make image light incident on the prism. An optical system including the projection lens may be configured as a relay optical system configured to form an intermediate image on the inside of the prism. The image-light generating unit may be configured such that, after the image light is reflected on a third surface, a first surface, and a second surface of the prism in this order, the image light is transmitted through the first surface to reach the user and external light is transmitted through the first surface and the third surface of the prism to reach the user.

In each of a light incident unit configured to make image light incident on the light guide unit and a light emitting unit configured to emit the image light guided by the light guide unit to the outside, a reflective volume hologram may be provided to diffract and reflect the image light.

The entire disclosure of Japanese Patent Application No. 2012-071587, filed Mar. 27, 2012 is expressly incorporated by reference herein.

What is claimed is:

1. A head-mounted display device that enables a user to visually recognize a virtual image in a state in which the head-mounted display device is mounted on the head of the user, the head-mounted display device comprising:
    an image processing unit configured to perform processing for generating an image;
    an image display unit including an image-light generating unit configured to generate image light representing the generated image, the image display unit being configured to enable a user to visually recognize the virtual image corresponding to the generated image and an external image;
    an image pickup unit provided in the image display unit and configured to pick up an image in a visual field direction of the user; and
    a detecting unit configured to specify an external apparatus visually recognized as the external image, the external apparatus being present in the picked-up image picked up by the image pickup unit, the detecting unit detecting a position in the picked-up image of the specified external apparatus;
    wherein:
        the image processing unit is configured to generate the generated image to be displayed in a position corresponding to the position of the specified external apparatus detected by the detecting unit such that the position of the generated image changes in conjunction with changes in the position of the specified external apparatus detected by the detecting unit, and
        the image processing unit is configured to generate the generated image as history information in a position visible to the user when the specified external apparatus is positioned outside the visual field direction of the user.

2. The head-mounted display device according to claim 1, wherein
    the detecting unit detects a position in the picked-up image of the specified external apparatus, and
    the image processing unit is further configured to generate an image in which information concerning the external apparatus is displayed in a position corresponding to the position of the specified external apparatus detected by the detecting unit.

3. The head-mounted display device according to claim 2, wherein the head-mounted display device causes the image display unit to display, as a virtual image, the information concerning the external apparatus in association with the external apparatus visually recognized as the external image and causes the user to visually recognize the external image in regions other than a region where the virtual image is displayed.

4. The head-mounted display device according to claim 2, wherein the image processing unit generates an image in which regions other than a region where the information concerning the external apparatus is displayed are black pixels.

5. The head-mounted display device according to claim 2, further comprising a receiving unit configured to receive the information concerning the external apparatus from the external apparatus.

6. The head-mounted display device according to claim 5, further comprising:
    an operation unit for the user to input operation information; and
    a transmitting unit configured to transmit a given command to the external apparatus, wherein
    the receiving unit receives, as the information concerning the external apparatus, information concerning commands operable in the external apparatus, and
    the transmitting unit transmits, among the operable commands, a command selected on the basis of the operation information to the external apparatus.

7. The head-mounted display device according to claim 1, wherein
    the detecting unit is configured to specify a plurality of external apparatuses visually recognized as external images, the external apparatuses being present in the picked-up image picked up by the image pickup unit, the detecting unit detecting positions in the picked-up image of the plurality of specified external apparatuses;
    the image processing unit is configured to generate a plurality of generated images to be displayed in positions corresponding to the positions of the plurality of specified external apparatuses detected by the detecting unit.

8. The head-mounted display device according to claim 1, wherein the image display unit is configured to display the generated image as the history information in a visual field of the user when the when the specified external apparatus is positioned outside the visual field of the user.

9. The head-mounted display device according to claim 1, wherein the image display unit is configured to display the generated image in the vicinity of the specified external apparatus in a visual field of the user.

10. The head-mounted display device according to claim 9, wherein generated image does not overlap the specified external apparatus in the visual field of the user.

11. The head-mounted display device according to claim 9, wherein the generated image includes selectable commands for operating the specified external apparatus, wherein the selectable commands do not overlap the specified external apparatus in the visual field of the user.

* * * * *